United States Patent
Murosawa et al.

(10) Patent No.: US 10,726,992 B2
(45) Date of Patent: *Jul. 28, 2020

(54) MULTILAYER CERAMIC ELECTRONIC DEVICE WITH DIELECTRIC LAYERS AND INTERNAL ELECTRODE LAYERS

(71) Applicant: TDK Corporation, Minato-ku, Tokyo (JP)

(72) Inventors: Shogo Murosawa, Tokyo (JP); Toshihiko Kaneko, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/589,884

(22) Filed: Oct. 1, 2019

(65) Prior Publication Data

US 2020/0035414 A1 Jan. 30, 2020

Related U.S. Application Data

(63) Continuation of application No. 16/397,928, filed on Apr. 29, 2019, now Pat. No. 10,636,568, which is a continuation of application No. 15/082,814, filed on Mar. 28, 2016, now Pat. No. 10,325,721.

(30) Foreign Application Priority Data

Mar. 27, 2015 (JP) .................... 2015-067587

(51) Int. Cl.
| | |
|---|---|
| *H01G 4/12* | (2006.01) |
| *H01G 4/30* | (2006.01) |
| *H01G 4/012* | (2006.01) |
| *H01G 4/232* | (2006.01) |

(52) U.S. Cl.
CPC ............ *H01G 4/012* (2013.01); *H01G 4/1209* (2013.01); *H01G 4/232* (2013.01); *H01G 4/30* (2013.01); *H01G 4/1227* (2013.01)

(58) Field of Classification Search
CPC .......... H01G 4/30; H01G 4/224; H01G 4/012; H01G 4/12; H01G 4/232; H01G 4/1209
See application file for complete search history.

(56) References Cited

U.S. PATENT DOCUMENTS

| | | | |
|---|---|---|---|
| 6,043,174 | A | 3/2000 | Maher et al. |
| 6,839,221 | B2 | 1/2005 | Sugimoto et al. |
| 8,947,851 | B2 | 2/2015 | Koizumi |

(Continued)

FOREIGN PATENT DOCUMENTS

| | | |
|---|---|---|
| JP | 07-074047 A | 3/1995 |
| JP | 10-51545 A | 2/1998 |

(Continued)

*Primary Examiner* — David M Sinclair
(74) *Attorney, Agent, or Firm* — Arent Fox LLP

(57) ABSTRACT

A multilayer ceramic electronic device comprising: a ceramic element body, in which a plurality of dielectric layers and a plurality of internal electrode layers are alternately stacked, and at least a pair of external electrodes which are connected to the internal electrode layers on surfaces of the ceramic element body; a thickness of the dielectric layers is 0.4 μm or less, a width (W0) of the ceramic element body along a width-direction is 0.59 mm or less, a gap (Wgap) between an outer face of the ceramic element body and an end of the internal electrode layers along width-direction of the ceramic element body is 0.010 to 0.025 mm, and a ratio (Wgap/W0) of the gap with respect to the width is 0.025 or more.

5 Claims, 5 Drawing Sheets

(56) References Cited

U.S. PATENT DOCUMENTS

| | | |
|---|---|---|
| 10,325,721 B2 | 6/2019 | Murosawa et al. |
| 2003/0016484 A1 | 1/2003 | Iwaida et al. |
| 2005/0180092 A1 | 8/2005 | Hibi et al. |
| 2010/0014214 A1 | 1/2010 | Yamazaki et al. |
| 2011/0102969 A1 | 5/2011 | Togashi |
| 2011/0141655 A1 | 6/2011 | Jeong et al. |
| 2012/0250217 A1 | 10/2012 | Fukunaga et al. |
| 2012/0262840 A1 | 10/2012 | Koizumi |
| 2013/0063862 A1 | 3/2013 | Kim et al. |
| 2013/0342957 A1 | 12/2013 | Konishi et al. |
| 2014/0022692 A1 | 1/2014 | Yoon et al. |
| 2014/0301013 A1 | 10/2014 | Kim |
| 2015/0027764 A1 | 1/2015 | Lee et al. |
| 2015/0070817 A1 | 3/2015 | Morita et al. |

FOREIGN PATENT DOCUMENTS

| | | |
|---|---|---|
| JP | 10-312933 A | 11/1998 |
| JP | 11-340083 A | 12/1999 |
| JP | 2007-180297 A | 7/2007 |
| JP | 2011-211033 A | 10/2011 |
| JP | 2012-49449 A | 3/2012 |
| JP | 2014-5155 A | 1/2014 |

MULTILAYER CERAMIC ELECTRONIC DEVICE WITH DIELECTRIC LAYERS AND INTERNAL ELECTRODE LAYERS

CROSS-REFERENCE TO RELATED APPLICATION

The present application is a continuation of U.S. patent application Ser. No. 16/397,928, filed Apr. 29, 2019, which is a continuation of U.S. patent application Ser. No. 15/082,814, filed Mar. 28, 2016, which claims priority to Japanese Patent Application No. 2015-067587, filed Mar. 27, 2015, the entire contents of each of which are incorporated herein by reference.

BACKGROUND OF THE INVENTION

1. Field of the Invention

The present invention relates to a multilayer ceramic electronic device in which dielectric layers are extremely thin.

2. Description of the Related Art

Together with miniaturization and thinning of electronic equipment, miniaturization and thinning of the multilayer ceramic electronic device stored therein are requested. Thus, thinning of the dielectric layers in the multilayer ceramic electronic device is requested.

As described in Patent Article 1, it is known to generate cracks during manufacturing in case that the dielectric layers in the multilayer ceramic electronic device are made thin, and a method to prevent the cracks is being developed.

However, although the conventional limit of the thickness of the dielectric layer was 1 μm or so, a technology making the thickness of the dielectric layer 0.5 μm or less is being developed with the recent technological innovation. Conventionally, a technology, considering means to prevent generation of the cracks and to ensure a capacitance in case that the thickness of the dielectric layer is made 0.5 μm or less, further 0.4 μm or less, has not been established.

[Patent Article 1] Japanese Unexamined Patent Publication No. H7-74047

SUMMARY OF THE INVENTION

The present invention has been made by considering the above circumstances, and a purpose of the present invention is to provide the multilayer ceramic electronic device which is capable of preventing generation of the cracks and of preventing drop of the capacitance, even when the thickness of the dielectric layers is made thin.

As a result of intensive studies of the above purpose, the present inventors has attained providing the multilayer ceramic electronic device which is capable of preventing generation of the cracks and of preventing drop of the capacitance, even when the thickness of the dielectric layers is 0.5 μm or less, further 0.4 μm or less, only by satisfying the specific dimensional relation, which lead to a completion of the invention.

Namely, the multilayer ceramic electronic device of the invention includes a ceramic element body, in which a plurality of dielectric layers and a plurality of internal electrode layers are alternately stacked, and at least a pair of external electrodes which are connected to the internal electrode layers on the surface of the ceramic element body, wherein the thickness of the dielectric layers is 0.4 μm or less, a width (W0) of the ceramic element body along width-direction is 0.59 mm or less, a gap (Wgap) between an outer face of the ceramic element body and an end of the internal electrode layers along width-direction of the ceramic element body is 0.010 to 0.025 mm, and a ratio (Wgap/W0) of the gap with respect to the width is 0.025 or more.

According to the invention, the multilayer ceramic electronic device which is capable of preventing generation of the cracks and of preventing drop of the capacitance, even when the thickness of the dielectric layers is 0.5 μm or less, and further 0.4 μm or less.

A ratio (te/td) of the thickness (te) of the internal electrode layers with respect to the thickness (td) of the dielectric layers is preferably 1.05 or less.

In case that an average grain size of the first dielectric grains constituting the dielectric layer placed between the internal electrode layers along the laminating direction is Di and an average grain size of the second dielectric grains in an exterior area placed outside of the laminating direction of an interior area in which the internal electrode layers are laminated interposing the dielectric layers along the laminating direction is Dg, Dg/Di≥1 is preferably satisfied.

In case that the average grain size of the first dielectric grains constituting the dielectric layers placed between the internal electrode layers along the laminating direction is Di, and an average grain size of the third dielectric grains constituting a lead-out area placed between the lead-out parts of the internal electrode layers connected to either one of the external electrode is Dh, Dh/Di≥1 is preferably satisfied.

With the relations above, the capacitance further improves even the dielectric layers are thinned. It has been generally reported that the specific permittivity decreases as the dielectric layers become thin. However, the present inventors have found that decrease of the specific permittivity can be prevented even the dielectric layers become thin by controlling the grain size of the dielectric grains in specific areas.

DESCRIPTION OF THE PREFERRED EMBODIMENTS

Hereinafter, the present invention will be described based on the embodiments shown by the figures.

Overall Structure of the Multilayer Ceramic Capacitor

First, an overall structure of the multilayer ceramic capacitor as an embodiment of the multilayer ceramic element component according to the present invention will be described.

Figure 1:
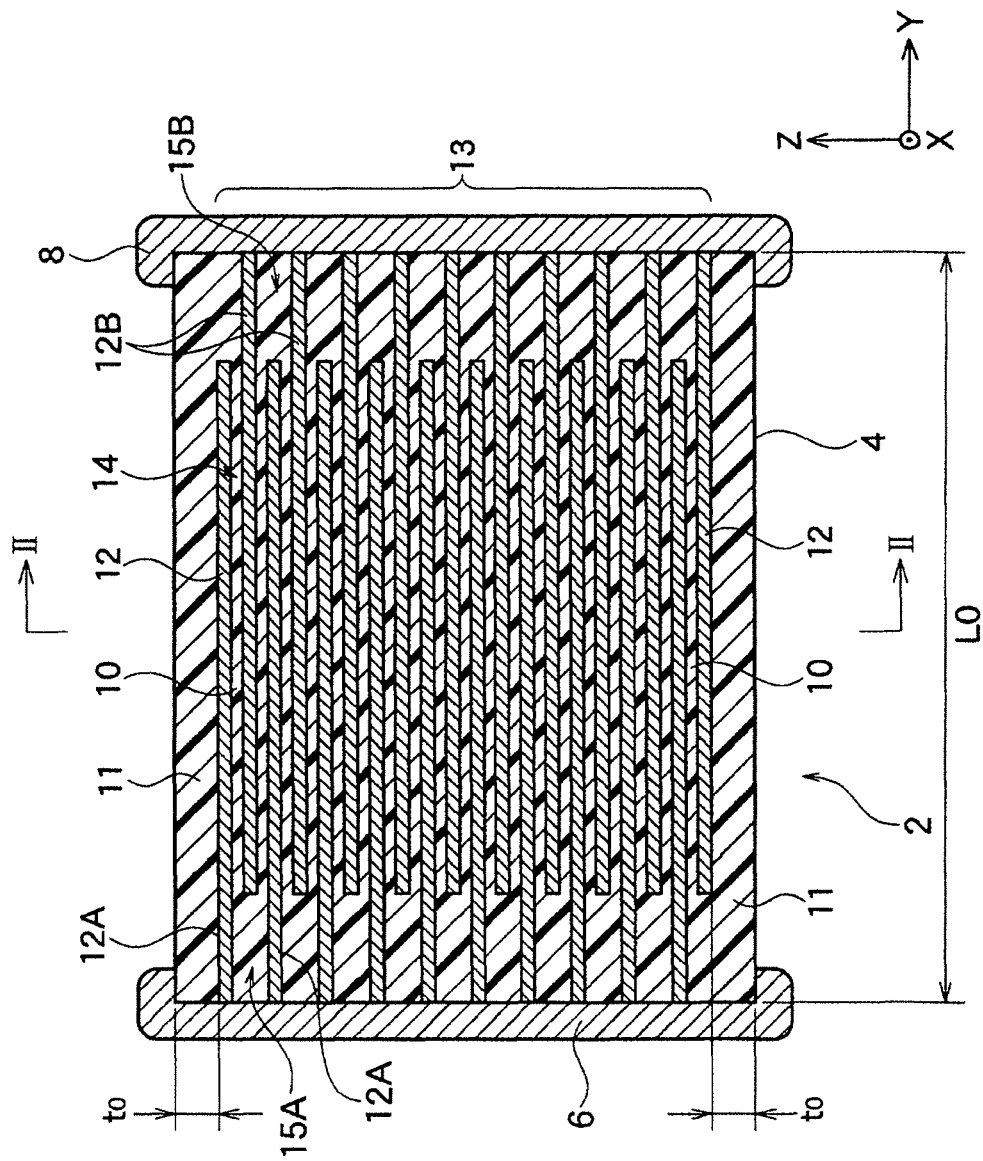
FIG. 1 is a schematic cross-sectional view of the multilayer ceramic capacitor according to an embodiment of the present invention.

As is shown in FIG. 1, multilayer ceramic capacitor 2 according to the present embodiment has a capacitor element body 4, the first terminal electrode 6 and the second terminal electrode 8. The capacitor element body 4 has inside dielectric layers 10 and internal electrode layers 12, in which the internal electrode layers 12 are alternately stacked between the inside dielectric layers 10. A part where the inside dielectric layers 10 and the internal electrode layers 12 are alternately stacked is an interior area 13.

The capacitor element body 4 has the exterior area 11 on both ends of the laminating direction Z (Z-axis) thereof. The exterior area 11 is formed by laminating a plurality of the dielectric layers, which are thicker than the inside dielectric layers 10 constituting the interior area 13.

One alternately stacked internal electrode layers 12 has a lead-out part 12A electrically connected to inside of the first terminal electrode 6, which is formed outside of the first end of the capacitor element body 4 in Y-axis direction. Further, the other alternately stacked internal electrode layers 12 has a lead-out part 12B electrically connected to inside of the second terminal electrode 8, which is formed outside of the second end of the capacitor element body 4 in Y-axis direction.

The interior area 13 has the capacitance region 14 and the lead-out areas 15A, 15B. The capacitance region 14 is a region where the internal electrode layers 12 are stacked sandwiching the inside dielectric layers 10 along the laminating direction. The lead-out area 15A is an area between the lead-out parts 12A of the internal electrode layers 12 connected to the external electrode 6. The lead-out area 15B is an area between the lead-out parts 12B of the internal electrode layers 12 connected to the external electrode 8.

Figure 2:
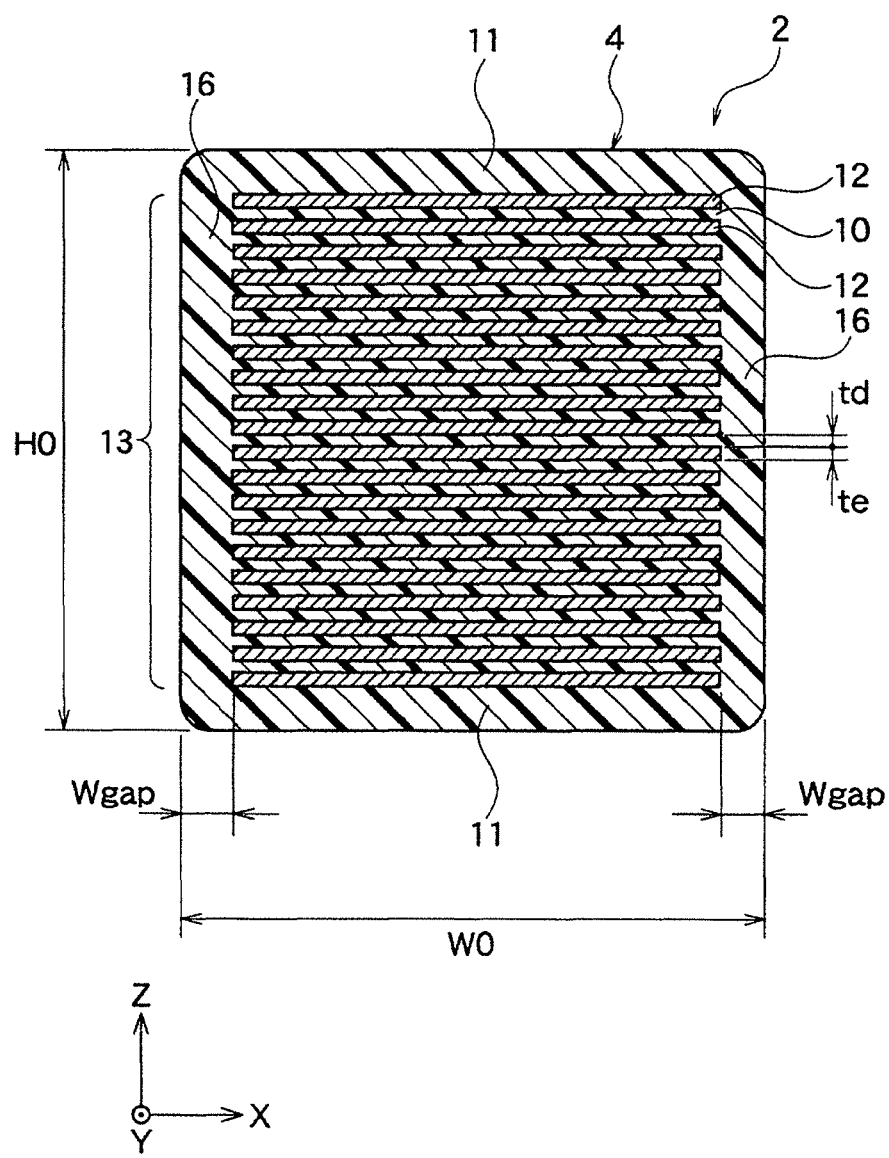
FIG. 2 is a cross-sectional view of FIG. 1 along line II-II.

As shown in FIG. 2, the side protection region 16 is formed on both ends of the capacitor element body 4 in X-axis direction. The side protection region 16 is configured by the same or the different dielectric material configuring the dielectric layers of inside dielectric layers 10 and/or the exterior area 11. Further, the lead-out areas 15A and 15B are configured by the same or the different dielectric material configuring the dielectric layers of inside dielectric layers 10.

Materials of the dielectric layers configuring the inside dielectric layers 10 and the exterior area 11 may be the same or different; they are not particularly limited and may be the dielectric materials having the perovskite structure such as $ABO_3$. In said $ABO_3$, "A" is at least a kind of Ca, Ba, Sr and so on and "B" is at least a kind of Ti, Zr and so on. Mole ratio of A/B is not particularly limited and is 0.980 to 1.020.

Although materials of the internal electrode layers 12 are not particularly limited, metals of Ni, Cu, Ag, Pd, Al and so on, and their alloys can be used.

Although materials of the terminal electrodes 6 and 8 are not particularly limited, at least a kind of Ni, Pd, Ag, Au, Cu, Pt, Rh, Ru, Ir and so on, or their alloys may be used. Generally, Cu, Cu alloys, Ni, Ni alloys, Ag, Ag—Pd alloys, In—Ga alloys and so on may be used.

Size and formation of the multilayer ceramic capacitor 2 can be suitably determined according to the application or the purpose thereof. In case that the multilayer ceramic capacitor 2 has a rectangular parallelepiped shape, the lengthwise L0 (see FIG. 1) is generally 0.2 to 5.7 mm, however, it is preferably 0.3 to 3.2 mm, more preferably 0.38 to 2.1 mm and the most preferably 0.38 to 1.60 mm in the present embodiment.

Note in FIG. 1, although a length of the capacitor element body 4 in Y-axis direction is drawn as the lengthwise L0 of the multilayer ceramic capacitor 2, it is almost the same with the length of the multilayer ceramic capacitor 2 in Y-axis direction including the terminal electrodes 6 and 8. Although the thickness of the terminal electrodes 6 and 8 is drawn thicker than the actual to easily show by the figures, it is 10 to 50 μm or so each in practice, and is extremely thin relative to the lengthwise L0. Further, in the figures, X-axis, Y-axis and Z-axis are mutually perpendicular, Z-axis corresponds to the lamination direction of the inside dielectric layers 10 and the internal electrode layers 12, and Y-axis corresponds to a direction in which the lead-out areas 15A and 15B (the lead-out parts 12A and 12B) are formed.

As shown in FIG. 2, a height H0 of the multilayer ceramic capacitor 2 varies according to laminating numbers of the inside dielectric layer 10 and the internal electrode layers 12. H0 is generally 0.2 to 3.2 mm and preferably 0.2 to 1.6 mm in the present embodiment. Although the height H0 of the multilayer ceramic capacitor 2 is drawn as the thickness of the capacitor element body 4 in Z-axis direction in FIG. 2, H0 is almost the same with the thickness including the terminal electrodes 6 and 8 in FIG. 1, since thickness of the terminal electrodes 6 and 8 is sufficiently thin.

Although the width W0 of the multilayer ceramic capacitor 2 is generally 0.2 to 5.0 mm, it is 0.59 mm or less, preferably 0.10 to 0.59 mm, more preferably 0.15 to 0.59 mm, and the most preferably 0.185 to 0.47 mm in the present embodiment. In case that the thickness of the dielectric layers is 0.4 μm or less, cracks are easy to generate to the capacitor element body after manufacturing when the width W0 becomes excessively large. The following can be considered for such cause.

In case that the thickness of the dielectric layers becomes thin, it is conceivable that density of the internal electrode layers in an interior area 13, which is a capacitance formation section, becomes relatively large, and stresses operating between the internal electrodes and the ceramic layers configuring the side protection region 16 or the exterior area 11 during firing becomes large. In particular, in case that the thickness of the dielectric layers is 0.4 μm or less and the width W0 is 0.80 mm or more, the density of the internal electrode at the interior area 13 which is the capacitance formation section becomes large and further, an area (a volume) occupying in the ceramic capacitor becomes large; and that effect of the stress becomes large and the cracks are easily generated.

Although the thickness td (see FIG. 2) of each inside dielectric layers 10 is generally several micrometers to several ten micrometers, it is 0.4 μm or less, preferably 0.4 to 0.1 μm, and the most preferably 0.4 to 0.3 μm in the present embodiment. It is preferable that the thickness te (see FIG. 2) of internal electrode layers 12 is almost the same with the thickness of the inside dielectric layers 10, more preferably te/td is determined 1.25 or less, and the most preferably te/td is determined 0.95 to 1.05. The crack preventing effect is improved with the constitution above.

In the present embodiment, width Wgap of each side protection region 16 in X-axis direction shown in FIG. 2 matches with the gap from the outer surface (an end face in X-axial direction) of ceramic element body 4 to the end of internal electrode layers 12 along the width direction (X-axial direction) of the ceramic element body 4. This width Wgap is 0.010 to 0.025 mm, and preferably 0.015 to 0.025 mm. The cracks tend to occur in case that the width Wgap is excessively small, while decrease of the capacitance tends to be significant when the width Wgap is excessively large.

This width Wgap is determined considering the width W0 of capacitor 2, and in the present embodiment, the ratio Wgap/W0 is 0.025 or more; the crack tends to generate in case said ratio is excessively small. Note each width Wgap of each side protection region 16 in X-axis direction formed on both sides of the capacitor element body 4 in X-axis direction may be mutually the same or different only when the above conditions are fulfilled.

Although the thickness "t0" (see FIG. 1) of the exterior area 11 is not particularly limited, it is in a range of preferably 15 to 200 μm, and more preferably 15 to 80 μm. By setting the thickness t0 within such range, the cracks are suppressed, the internal electrode layers 12 and the inside dielectric layer 10 are protected, and it also contribute to the reduction in size. Each thickness t0 of the exterior area 11 formed on both ends of the capacitor element body 4 in Z-axis direction may be mutually the same or different only when the above conditions are fulfilled.

In particular, in the present embodiment, in case that an average grain size of the first dielectric grains constituting the inside dielectric layer 10 is Di and an average grain size of the second dielectric grains placed in the exterior area 11 is Dg, $Dg/Di \geq 1$ is preferably satisfied, $Dg/Di \geq 1.05$ is more preferably satisfied, and $Dg/Di \geq 1.15$ is the most preferably satisfied. With the constitution above, the capacitance further improves even when the dielectric layers are thinned. It has been reported in general that the specific permittivity tends to decrease along with thinning of the dielectric layers. However, the present inventors have found that the decrease of the specific permittivity can be prevented even when the dielectric layers are thinned by controlling the grain size of the dielectric grains in the specific areas.

Further, in the present embodiment, in case that an average grain size of the first dielectric grains constituting the inside dielectric layer 10 is Di and an average grain size of the third dielectric grains constituting lead-out areas 15A and 15B is Dh, $Dh/Di \geq 1$ is preferably satisfied, $Dh/Di \geq 1.1$ is more preferably satisfied, and $Dh/Di \geq 1.2$ is the most preferably satisfied. With the constitution above, the capacitance further improves even when the dielectric layers are thinned. It has been reported in general that the specific permittivity tends to decrease along with thinning of the dielectric layers. However, the present inventors have found that the decrease of the specific permittivity can be prevented even when the dielectric layers are thinned by controlling the grain size of the dielectric grains in the specific areas.

The reason to suppress decrease of the specific permittivity even when the dielectric layers are thinned may be considered as following.

Namely, it is conceivable that compressive stress is provided to the dielectric of the capacitance region 14 by making the average grain of the dielectric grains in the capacitance region 14 larger than the average grain of the dielectric grains constituting the exterior area 11 or the lead-out areas 15A and 15B. Thus, the specific permittivity is conceivable to improve. Although the dielectric of the capacitance region 14 of the multilayer ceramic capacitor 2 has polycrystal body and that compression direction thereof is not limited, it is conceivable that making crystal grain size of the dielectric of the exterior area 11 or the lead-out areas 15A and 15B large contributes to an improvement of the specific permittivity.

In particular, it was confirmed that it was particularly effective when the thickness of the inside dielectric layers 10 is 0.5 μm or less. In case that the dielectric layers are thicker than 0.5 μm, the specific permittivity is high without providing the compressive stress (without controlling the grain ratio) to the dielectric of the capacitance region in the multilayer ceramic capacitor. While when the dielectric layers are 0.5 μm or less, the decrease of the specific permittivity is prevented, and the specific permittivity can be improved on the contrary.

From these viewpoints, this can also be said to the dielectric grains in the side protection region 16, which can be constituted with the same dielectric grains in the lead-out areas 15A and 15B. Namely, in case that the average grain size of the first dielectric particles constituting the inside dielectric layers 10 is Di and the average grain size of the fourth dielectric grains constituting the side protection region 16 is Dh', $Dh'/Di \geq 1$ is preferably satisfied, $Dh'/Di \geq 1.1$ is more preferably satisfied, and $Dh'/Di \geq 1.2$ is the most preferably satisfied.

Method for Manufacturing the Multilayer Ceramic Capacitor

Next, a method for manufacturing the multilayer ceramic capacitor 2 as an embodiment of the invention will be described.

First, a paste for an inside green sheet and a paste for an outside green sheet are prepared in order to manufacture an inside green sheet 10a constituting the inside dielectric layer 10 and an outside green sheet 11a constituting an outside dielectric layer of an exterior area 11, after firing shown in FIG. 1.

The paste for the inside green sheet and the paste for the outside green sheet are generally composed of an organic solvent based paste, obtained by kneading ceramic powders and an organic vehicle, or a water based paste.

Materials of the ceramic powders are suitably selected from various compounds which become composite oxides or oxides, such as carbonates, nitrates, hydro oxides, the organic metal compounds and so on; and used by mixing thereof. Materials of the ceramic powders are used as powders having the average particle size of 0.45 μm or less, and preferably 0.1 to 0.3 μm or so in the present embodiment. Note it is desirable to use the powders finer than the thickness of the green sheet in order to make the inside green sheet extremely thin.

The organic vehicle is obtained by dissolving a binder in the organic solvent. The binder used for the organic vehicle is not particularly limited, and may be suitably selected from various kinds of general binders such as ethyl cellulose, polyvinyl butyral, etc.

The organic solvent is also not particularly limited and may be suitably selected from various kinds of the organic solvents, such as terpineol, butyl carbitol, acetone, toluene, etc., according to a process of use, such as a printing process or a sheet process.

The paste for the green sheet may include additives selected from a variety of dispersants, plasticizers, dielectrics, subcomponent compounds, glass frits, insulators and so on, according to needs.

As the plasticizers, phthalic esters, such as dioctyl phthalate or benzylbutyl phthalate and so on, adipic acids, phosphoric esters, glycols and so on can be exemplified.

Next, a paste for internal electrode pattern layer forming the internal electrode layers 12 shown in FIG. 1 is prepared. The paste for internal electrode pattern layers is prepared by kneading the conductive materials, constituted by the above-mentioned various conductive metals and alloys thereof, or various oxides, organic metal compounds, resinates, etc., which become the above-mentioned conductive materials after firing, and the abovementioned organic vehicle. The paste for internal electrode pattern layers may include ceramic powder as an inhibitor, when required. Note said inhibitor works to prevent sintering of the conductive powders during the firing process.

Figure 3:
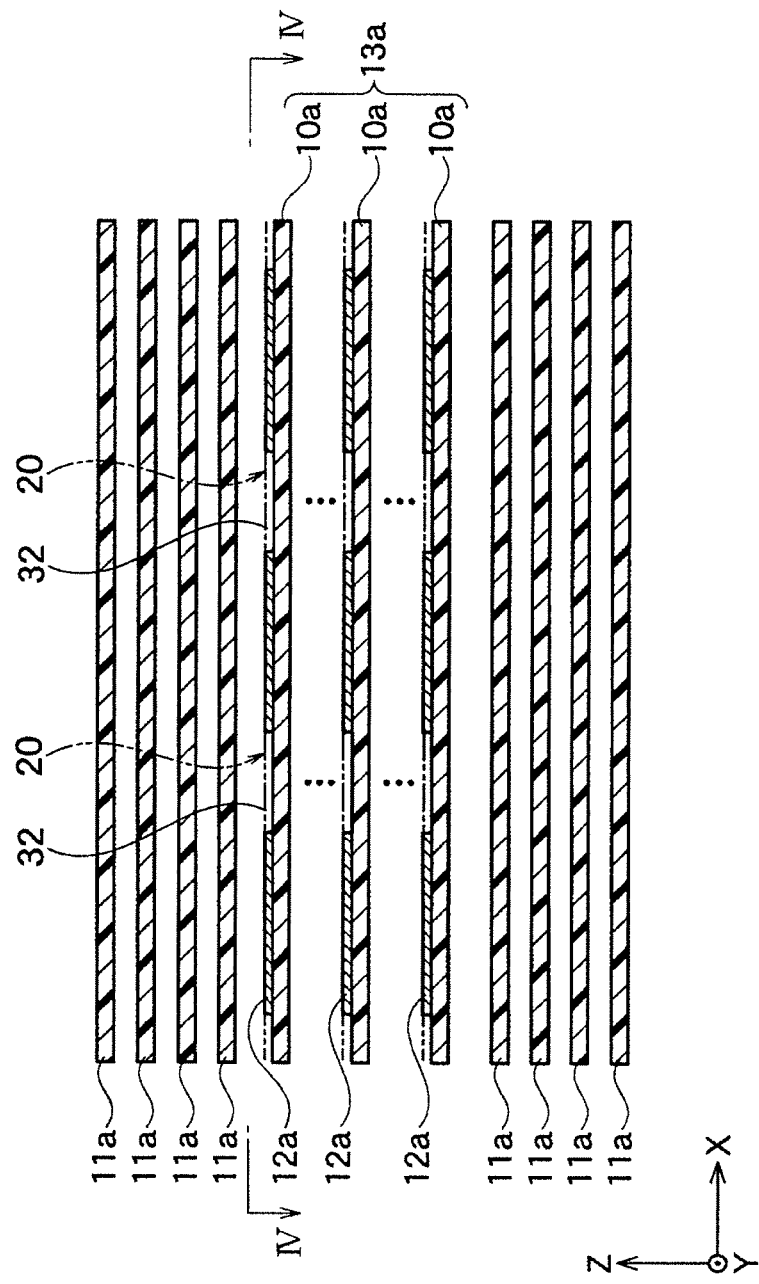
FIG. 3 is a schematic cross-sectional view showing the laminating process of green sheet in manufacturing process of the multilayer ceramic capacitor as shown in FIG. 1.

By using the paste for the inside green sheet and the paste for internal electrode pattern layer prepared above, the internal laminated body 13a, which becomes the interior area 13 after firing, is manufactured by alternately laminating the inside green sheet 10a, which becomes the inside dielectric layer 10 after firing, and the internal electrode pattern layer 12a, which becomes the internal electrode layers 12 after firing, as shown in FIG. 3. Further, after or before manufacturing the internal laminated body 13a, the outside green sheet 11a, which becomes an outside dielectric layer of the exterior area 11 after firing is formed by using the paste for the outside green sheet.

In concrete, the inside green sheet 10a is formed on the carrier sheet (e.g. PET film) as support such as by doctor blade, at first. The inside green sheet 10a is dried after formed on the carrier sheet.

Next, the inside green sheet 10a having the internal electrode pattern layer 12a is obtained by forming the internal electrode pattern layer 12a on the inside green sheet 10a formed as described above by using the paste for internal electrode pattern layer. Then, said inside green sheets 10a having the internal electrode pattern layers 12a are alternately laminated and the internal laminated body 13a is obtained. Although formation method of the internal electrode pattern layer 12a is not particularly limited, printing process, transfer process and so on may be mentioned. Note the inside green sheets 10a having the internal electrode pattern layers 12a can be laminated via the adhesive layers.

Similar to the inside green sheet 10a, the outside green sheet 11a is formed on the carrier sheet as the support. The outside green sheet 11a is dried after forming on the carrier sheet. Note the thickness of the outside green sheet 11a is sufficiently thicker than the inside green sheet 10a.

Figure 4:
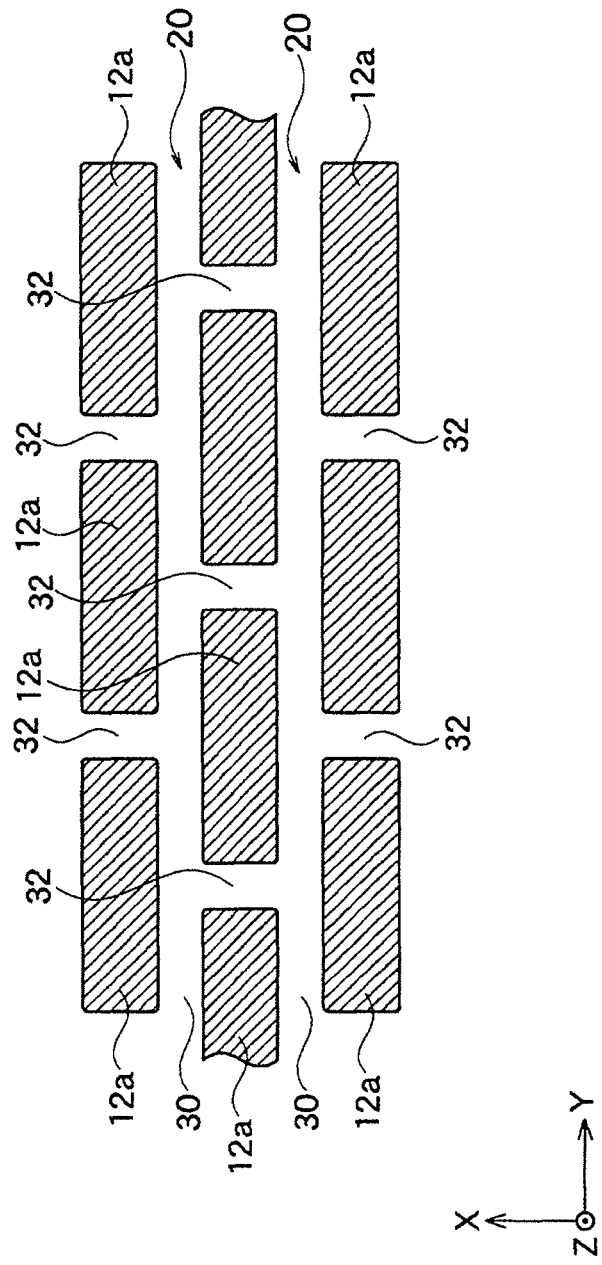
FIG. 4 is a plane view showing a part of a pattern of the internal electrode layer of FIG. 3 along line IV-IV.

As shown in FIG. 4, the internal electrode pattern layers 12a are formed on surfaces of the inside green sheets 10a; and therebetween, a gap 30 along a longitudinal direction Y of the internal electrode pattern layer 12a and a gap 32 along a short-length direction X of the internal electrode pattern layer 12a are formed, which have the lattice pattern in the plan views. Within the gaps 30 and 32 of the lattice pattern, step absorbing layers 20 shown in FIG. 3 can be formed. Note FIG. 3 only shows the gap 32.

Forming the step absorbing layers 20 in these gaps 30 and 32 will eliminate difference in level on the surface of the green sheet 10a due to the internal electrode pattern layer 12a; and this will also contributes to deformation prevention of the finally obtained the capacitor element body 4. The step absorbing layers 20 is formed by such as printing process, similar with e.g. the internal electrode pattern layer 12a. The step absorbing layers 20 include the ceramic powders and the organic vehicle, similar with the green sheet 10a. The step absorbing layers 20, however, unlike the green sheet 11a, is formed by printing; and that it is adjusted easy to print. Although the printing process is not particularly limited, screen printing, gravure printing and so on is mentioned, and the screen printing is preferable.

An organic binder component (polymer resin+plasticizer) and the various additives of the printing pate for forming the step absorbing layers 20 are similar to the ones used for the slurry of the green sheet. Except, they are not necessary the same with the ones used for the slurry of the green sheet, and can be different. Although the thickness of the step absorbing layers 20 is not particularly limited, it is preferably 50 to 100% with respect to the thickness of the internal electrode pattern layer 12a.

Note a prescribed number of the inside green sheets 10a and the internal electrode pattern layers 12a may be alternately laminated directly on the outside green sheet 11a, instead of laminating the internal laminated body 13a on the outside green sheet 11a. In addition, a laminated body unit, in which a plurality of the inside green sheets 10a and a plurality of the internal electrode pattern layers 12a are alternately laminated, may be preliminary manufactured; and a predetermined number of said laminated body units may be laminated on the outside green sheet 11a.

Figure 5A:
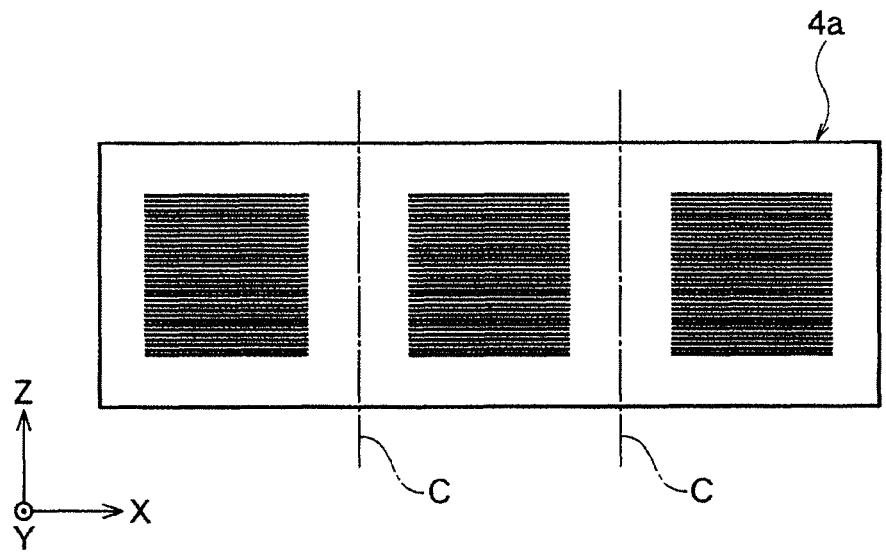
FIG. 5A is a schematic cross-sectional view parallel to X-Z axis plane of a laminated body after laminating the green sheet shown in FIG. 3.
Figure 5B:
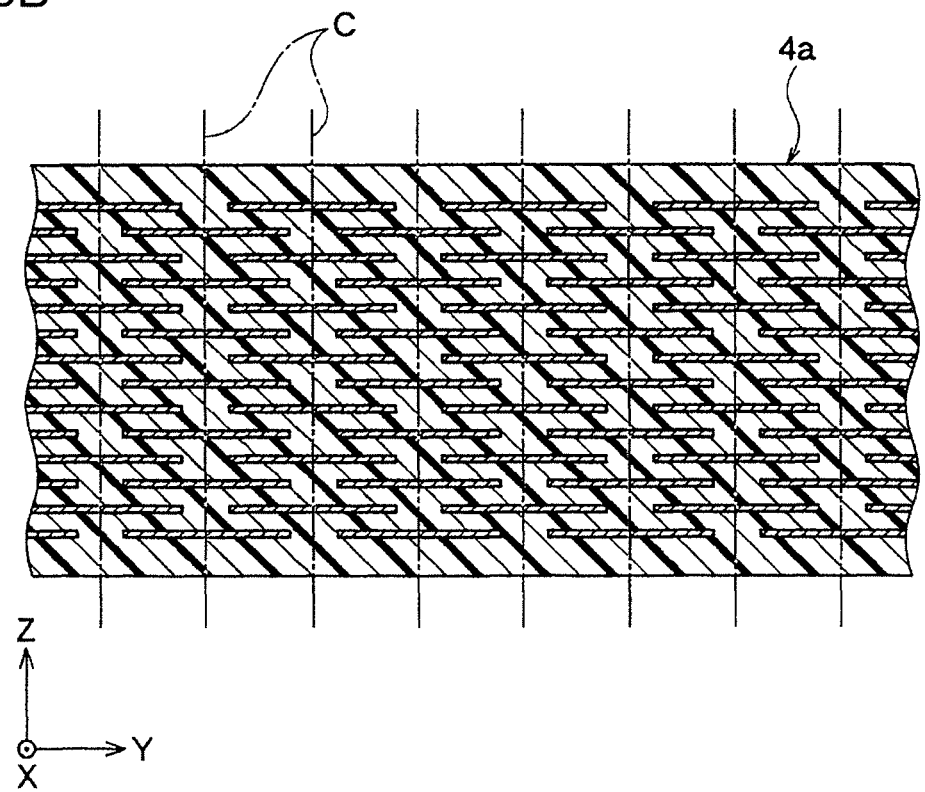
FIG. 5B is an enlarged schematic cross-sectional view parallel to Y-Z axis plane of a laminated body after laminating the green sheet shown in FIG. 3.

As shown in FIGS. 5A and 5B, the obtained green laminated body 4a is cut to a predetermined size along, e.g. the cut line C, making the green chips. The plasticizer is removed and the green chips are solidified by drying and solidification of the green chips. The green chips after drying and solidification are put in a barrel container with a media and a polishing solution, and barrel polished by such as a horizontal centrifugal barrel machine. The green chips after the barrel polish are washed with water and dried. The capacitor element body 4 shown in FIG. 1 can be obtained by carrying out a de-binder process, a firing process and an anneal process when required to the green chips after drying. Note FIGS. 5A and 5B are only the schematic cross-sectional views, and laminating numbers or the dimensional relations differ from the actual.

An end polishing by such as barrel polish is carried out to the thus obtained sintered body (element body 4), the paste for the terminal electrode is fired on the sintered body, and the terminal electrodes 6 and 8 are obtained. Then, plating or other method is carried out on the terminal electrodes 6 and 8 when required forming the pad layer. Note the paste for the terminal electrode can be prepared similar to the paste for internal electrode pattern layer mentioned above.

Thus manufactured multilayer ceramic capacitor 2 is implemented on a printing substrate and so on by such as soldering, and is used for various electronic equipments.

According to the multilayer ceramic capacitor 2 of the present embodiment, the thickness of the dielectric layer 10 is 0.4 µm or less, the width W0 is 0.59 mm or less, the gap Wgap is 0.010 to 0.025 mm, and a ratio of the gap with respect to the width: Wgap/W0 is 0.025 or more. Thus, even when the thickness of the dielectric layer is made thin, generation of the cracks can be prevented and the decrease of the capacitance is less.

Note the present invention is not limited to the embodiments described above, and can be variously modified within the range of the invention.

For instance, according to the general manufacturing method described above, the particle size of the dielectric particles included in the dielectric paste as materials forming each dielectric grains constituting the inside dielectric layer 10, the exterior area 11, the lead-out areas 15A and 15B, shown in FIGS. 1 and 2 are approximately the same. Therefore, in the multilayer ceramic capacitor 2 shown in FIGS. 1 and 2 obtained as a result, in case that the thickness of the dielectric layer 10 sandwiched between the internal electrode layers 12 is 0.4 µm or less, the average grain size of the dielectric grains in the dielectric layer 10 sandwiched between the internal electrode layers 12 is relatively larger than the same of the dielectric grains in the areas 11, 15A and 15B, which are not sandwiched between the internal electrode layers 12. The cause may be considered that a particle growth of dielectric particles in the dielectric layer 10 sandwiched between the internal electrode layers 12 are likely to progress.

Namely, according to the embodiment above, in case that an average grain size of the first dielectric grains constituting the dielectric layer 10 is Di and an average grain size of the second dielectric grains in an exterior area 11 is Dg, Dg/Di<1 is satisfied. Further, according to the embodiment above, in case that an average grain size of the third dielectric grains constituting the lead-out areas 15A and 15B is Dh, Dh/Di<1 is satisfied. Further, in case that the average grain size of the fourth dielectric grains constituting the side protection region 16 is Dh', Dh'/Di<1 is satisfied.

Thus, according to the manufacturing method of the other embodiment of the invention, the average particle size of the dielectric particles as an dielectric paste material constituting the inside dielectric layer 10 shown in FIGS. 1 and 2 is made large, relative to the same of the dielectric particles included in the dielectric paste material forming each dielectric grain constituting the exterior area 11 and/or the lead-out areas 15A and 15B. Or otherwise, the dielectric particles included in the dielectric paste material forming each dielectric grains constituting the exterior area 11 and/or the lead-out areas 15A and 15B is made small, relative to the same of the average particle size of the dielectric particles as an dielectric paste material constituting the inside dielectric layer 10.

As a result, the capacitor element body 4 after firing satisfy the relations of either Dg/Di≥1, Dh/Di≥1 or Dh'/Di≥1, or all of said relations can be satisfied. The followings can be considered for the cause. As the particle size of the dielectric particles in the dielectric paste materials is small, said dielectric particles become thermally active and that the particle growth is easily generated during firing. Therefore, by making the average grain size of the dielectric grains constituting the exterior area 11 and/or the lead-out areas 15A and 15B smaller than the same of the dielectric grains constituting the inside dielectric layer 10, which is the capacitance part, the dielectric grains constituting the exterior area 11 and/or the lead-out areas 15A and 15B are more easy to generate the particle growth than the dielectric grains constituting the inside dielectric layer 10, which is the capacitance part. Then, as a result, the dielectric grains of the exterior area 11 and/or the lead-out areas 15A and 15B can be made larger.

With the relations above, the capacitance further improves even when the inside dielectric layer 10 is thinned. It has been reported that the specific permittivity generally decreases as the inside dielectric layer 10 becomes thin. The present inventors, however, have found that the decrease of the specific permittivity can be suppressed even when the inside dielectric layer 10 is thinned by controlling the grain size of the dielectric grains in the specific areas.

Further, in the invention, the relations above may be satisfied in the capacitor element body 4 after firing by a method other than varying the average particle size of the dielectric particles in the dielectric paste material. For instance, the composition of the dielectric particles as the dielectric paste material constituting the inside dielectric layer 10 may be different from the composition of the dielectric particles included in the dielectric paste material forming each dielectric particles constituting the exterior area 11 and/or the lead-out areas 15A and 15B. For instance, the composition of the dielectric particles included in the dielectric paste material forming each dielectric particles constituting the exterior area 11 and/or the lead-out areas 15A and 15B may be made to more easily generate the particle growth.

The particle size of the dielectric grains after firing can be also controlled by interposing a dummy electrode, not connected to the terminal electrodes 6 and 8, between outside dielectric green sheets 11a at the exterior area 11.

Note the multilayer ceramic electronic device of the invention can be applied not only to the multilayer ceramic capacitor, but to the other multilayer type ceramic electronic device. As the other multilayer type ceramic electronic device, all the electronic devices, in which the dielectric layers are laminated via internal electrode can be mentioned; and for instance, band-pass filter, inductor, multilayer three-terminal filter, piezoelectric element, PTC thermistor, NTC thermistor, varistor and so on can be mentioned.

EXAMPLES

Hereinafter, the present invention will be described based on the further details of the examples; however, the invention is not limited to the examples.

Example 1

Firstly, $\{(Ba_{1-x-y}Ca_xSr_y)O\}_u(Ti_{1-z}Zr_z)_vO_3$ powder (x=0.05, y=0, z=0.05 and u/v=1.004) having the average particle size of 100 nm as a powdery material of the main material was prepared. Next, $MgCO_3$, $MnCO_3$, $Y_2O_3$, $SiO_2$ were respectively prepared as subcomponents. Note the subcomponents were preliminary broken down in advance and processed to around 40 nm, which is smaller than the particle size of barium titanate raw materials.

Next, each powdery material prepared above was weighed by the followings. 0.5 moles of $MgCO_3$ powder, 0.3 moles of $MnCO_3$ powder, 0.2 moles of $Y_2O_3$ powder, and 2 moles of $SiO_2$ powder, with respect to 100 moles of the main material were weighed. Said each powdery material was wet mixed for 20 hours with ball mill, and dried thereof to obtain a dielectric raw material at the capacitance part. The added $MgCO_3$ and $MnCO_3$ were included in the dielectric ceramic composition after firing as MgO and MnO, respectively.

Next, 100 parts by weight of the obtained dielectric raw material, 10 parts by weight of polyvinyl butyral resin, 5 parts by weight of dioctyl phthalate (DOP) as the plasticizer, and 100 parts by weight of an alcohol as the solvent were mixed by a ball-mill and were pasted to obtain a dielectric layer paste of the capacitance region 14.

Further, in addition to above, 44.6 parts by weight of Ni particles, 52 parts by weight of terpineol, 3 parts by weight of ethyl cellulose and 0.4 parts by weight of benzotriazole were kneaded by a triple-roll, pasted thereof to manufacture an internal electrode layer paste.

Further, as the dielectric raw material of the exterior area 11, a powdery main material having the average particle size of 100 nm, which is the same with that of the dielectric particles in the capacitance region 14, was prepared. Said powdery main material was wet-mixed and pasted with the subcomponents, and obtained a dielectric paste for the exterior area.

The dielectric layer paste manufactured above was used to form the green sheet on a PET film. The thickness of the green sheet was adjusted to obtain the thickness td of the dielectric layers after firing as described in Table 1. Next, an electrode layer was printed thereon in a predetermined pattern by using the internal electrode layer paste. The thickness of the electrode layer in the predetermined pattern was adjusted to obtain the thickness te of the internal electrode layers after firing as described in Table 1.

Further, in order to absorb steps, where the electrodes are not printed, the step absorbing layer 20 was formed by carrying out the pattern printing using the same as the dielectric paste in the capacitance region 14, and the green sheet 10a having the internal electrode pattern layers 12a and the step absorbing layers 20 was manufactured.

Next, the dielectric paste for forming the exterior area 11 was used to form the green sheet on a PET film. The thickness of the green sheet for forming the exterior area 11 was 10 µm. At the time, the green sheet for forming the exterior area 11 was formed by using the green sheet using the dielectric raw material of 100 nm.

Plurality of the green sheets for the interior area 13 having the internal electrode layers and plurality of the green sheets for the exterior area 11 were laminated; and adhered thereof by pressure to obtain a green laminated body. The green laminated body was then cut to a predetermined size to obtain the green chips.

Next, the binder removal process, the firing and the annealing were carried out to the obtained green chip under the following conditions, and obtained a multilayer ceramic fired body.

The binder removal process was performed under a rate of temperature increase of 25° C./hour, a holding temperature of 235° C., a holding time of 8 hours, and an atmosphere of air.

Firing conditions were the rate of temperature increase of 600 to 1,000° C./hour, the holding temperature of 1,100 to 1150° C., the holding time of 1 hour, and a rate of temperature decrease of 200° C./hour, and the atmospheric gas was a humidified $N_2+H_2$ mixed gas (an oxygen partial pressure of $10^{-12}$ MPa).

Annealing conditions were the rate of temperature increase of 200° C./hour, the holding temperature of 1,050° C., the holding time of 3 hours, the rate of temperature decrease of 200° C./hour, and the atmospheric gas of a humidified $N_2$ gas (an oxygen partial pressure: $10^{-7}$ MPa).

Note a wetter was used to humidify the atmospheric gas when firing and annealing.

Next, after polishing end faces of the obtained multilayer ceramic fired body, Cu paste as the external electrode was coated thereon, and then firing processing was performed in a reduced atmosphere to obtain sample numbers 1 to 25 of the multilayer ceramic capacitor samples (hereinafter, sometimes merely referred to as "capacitor sample") as shown in Table 1.

The lengthwise L0, the width W0 and the width W gap of the obtained capacitor sample were varied for each sample, as shown in Table 1.

The capacitance and the crack generation rate of the obtained capacitor samples were respectively confirmed by the following methods.

(The Capacitance)

Capacitances of the capacitor samples were measured at a reference temperature of 25° C. by digital LCR meter under the conditions of frequency at 1 kHz and input signal level (measured voltage) at 1.0 Vrms. The numerical value of the capacitance shown in Table 1 is shown as a capacitance ratio, by determining the capacitance of the capacitance element body, showing Wgap of 0.020 with respect to a predetermined L0 and W0, as 1. For instance, the capacitance of sample numbers 3 to 7 are the ratios referring to the capacitance of sample number 5. The capacitances of 0.90 or more were determined good. Results are shown in Table 1.

(The Crack Generation Rate)

A measurement method of the crack generation rate is as follows. Said ratio is the cracks detected ratio by visually observing the outward appearance of the manufactured samples (n=1,000) using such as a microscope. The crack generation rate of 0 to 1.0 were determined good, and 0 to 0.1 were determined particularly good. Results are shown in Table 1.

TABLE 1

| No. | L0 [mm] | W0 [mm] | Wgap [mm] | Wgap/W0 | Thickness of dielectric layers td [µm] | Thickness of internal electrode te [µm] | Crack generation rate [%] | Capacitance ratio |
|---|---|---|---|---|---|---|---|---|
| 1 | 1.60 | 0.80 | 0.025 | 0.031 | 0.4 | 0.4 | 6.5 | 0.98 |
| 2 | 1.60 | 0.80 | 0.020 | 0.025 | 0.4 | 0.4 | 3 | 1 |
| 3 | 1.02 | 0.59 | 0.030 | 0.051 | 0.4 | 0.4 | 0 | 0.88 |
| 4 | 1.02 | 0.59 | 0.025 | 0.042 | 0.4 | 0.4 | 0.6 | 0.99 |
| 5 | 1.02 | 0.59 | 0.020 | 0.034 | 0.4 | 0.4 | 0.6 | 1 |
| 6 | 1.02 | 0.59 | 0.015 | 0.025 | 0.4 | 0.4 | 1 | 1.01 |
| 7 | 1.02 | 0.59 | 0.010 | 0.017 | 0.4 | 0.4 | 34 | 1.04 |
| 8 | 0.620 | 0.470 | 0.030 | 0.064 | 0.4 | 0.4 | 0 | 0.89 |
| 9 | 0.620 | 0.470 | 0.025 | 0.053 | 0.4 | 0.4 | 0 | 0.96 |
| 10 | 0.620 | 0.470 | 0.020 | 0.043 | 0.4 | 0.4 | 0.2 | 1 |
| 11 | 0.620 | 0.470 | 0.015 | 0.032 | 0.4 | 0.4 | 0.1 | 1.05 |
| 12 | 0.620 | 0.470 | 0.013 | 0.028 | 0.4 | 0.4 | 0.8 | 1.09 |
| 13 | 0.620 | 0.470 | 0.010 | 0.021 | 0.4 | 0.4 | 30 | 1.12 |
| 14 | 0.620 | 0.350 | 0.030 | 0.086 | 0.4 | 0.4 | 0 | 0.87 |
| 15 | 0.620 | 0.350 | 0.025 | 0.071 | 0.4 | 0.4 | 0 | 0.94 |
| 16 | 0.620 | 0.350 | 0.020 | 0.057 | 0.4 | 0.4 | 0 | 1 |
| 17 | 0.620 | 0.350 | 0.015 | 0.043 | 0.4 | 0.4 | 0.1 | 1.08 |
| 18 | 0.620 | 0.350 | 0.010 | 0.029 | 0.4 | 0.4 | 0.4 | 1.14 |
| 19 | 0.620 | 0.350 | 0.005 | 0.014 | 0.4 | 0.4 | 40 | 1.15 |
| 20 | 0.380 | 0.185 | 0.030 | 0.162 | 0.4 | 0.4 | 0 | 0.79 |
| 21 | 0.380 | 0.185 | 0.025 | 0.135 | 0.4 | 0.4 | 0 | 0.9 |
| 22 | 0.380 | 0.185 | 0.020 | 0.108 | 0.4 | 0.4 | 0 | 1 |
| 23 | 0.380 | 0.185 | 0.015 | 0.081 | 0.4 | 0.4 | 0 | 1.05 |
| 24 | 0.380 | 0.185 | 0.010 | 0.054 | 0.4 | 0.4 | 0.5 | 1.19 |
| 25 | 0.380 | 0.185 | 0.005 | 0.027 | 0.4 | 0.4 | 19 | 1.27 |

Example 2

As shown in Table 2, samples of the multilayer ceramic capacitors were manufactured similarly with Example 1, except the thickness td of the dielectric layer 10 after firing and the thickness te of the internal electrode layers 12 after firing were 0.3 μm. The capacitance and the crack generation rate thereof were respectively measured similarly with Example 1. Results are shown in Table 2.

Example 3

Samples of the multilayer ceramic capacitors were manufactured similarly with Example 1, except the thickness te of the internal electrode layers 12 after firing were varied. The capacitance and the crack generation rate thereof were respectively measured similarly with Example 1. Results are shown in Table 3.

TABLE 2

| No. | L0 [mm] | W0 [mm] | Wgap [mm] | Wgap/W0 | Thickness of dielectric layers td [μm] | Thickness of internal electrode te [μm] | Crack generation rate [%] | Capacitance ratio |
|---|---|---|---|---|---|---|---|---|
| 26 | 1.02 | 0.59 | 0.025 | 0.042 | 0.3 | 0.3 | 0.6 | 0.96 |
| 27 | 1.02 | 0.59 | 0.020 | 0.034 | 0.3 | 0.3 | 0.7 | 1 |
| 28 | 1.02 | 0.59 | 0.015 | 0.025 | 0.3 | 0.3 | 0.9 | 1.01 |
| 29 | 1.02 | 0.59 | 0.010 | 0.017 | 0.3 | 0.3 | 28 | 1.08 |
| 30 | 0.620 | 0.470 | 0.025 | 0.053 | 0.3 | 0.3 | 0.2 | 0.97 |
| 31 | 0.620 | 0.470 | 0.020 | 0.043 | 0.3 | 0.3 | 0.2 | 1 |
| 32 | 0.620 | 0.470 | 0.015 | 0.032 | 0.3 | 0.3 | 0.3 | 1.06 |
| 33 | 0.620 | 0.470 | 0.013 | 0.028 | 0.3 | 0.3 | 0.9 | 1.07 |
| 34 | 0.620 | 0.470 | 0.010 | 0.021 | 0.3 | 0.3 | 40 | 1.11 |
| 35 | 0.620 | 0.350 | 0.030 | 0.100 | 0.3 | 0.3 | 0 | 0.87 |
| 36 | 0.620 | 0.350 | 0.025 | 0.071 | 0.3 | 0.3 | 0.1 | 0.95 |
| 37 | 0.620 | 0.350 | 0.020 | 0.057 | 0.3 | 0.3 | 0 | 1 |
| 38 | 0.620 | 0.350 | 0.015 | 0.043 | 0.3 | 0.3 | 0.3 | 1.05 |
| 39 | 0.620 | 0.350 | 0.010 | 0.029 | 0.3 | 0.3 | 1 | 1.07 |
| 40 | 0.620 | 0.350 | 0.005 | 0.014 | 0.3 | 0.3 | 46 | 1.19 |
| 41 | 0.380 | 0.185 | 0.030 | 0.162 | 0.3 | 0.3 | 0 | 0.82 |
| 42 | 0.380 | 0.185 | 0.025 | 0.135 | 0.3 | 0.3 | 0 | 0.95 |
| 43 | 0.380 | 0.185 | 0.020 | 0.108 | 0.3 | 0.3 | 0.3 | 1 |
| 44 | 0.380 | 0.185 | 0.015 | 0.081 | 0.3 | 0.3 | 0 | 1.12 |
| 45 | 0.380 | 0.185 | 0.010 | 0.054 | 0.3 | 0.3 | 0.8 | 1.17 |
| 46 | 0.380 | 0.185 | 0.005 | 0.027 | 0.3 | 0.3 | 13 | 1.34 |

Evaluation 1

From the results shown in Tables 1 and 2, it was confirmed that the multilayer ceramic capacitor with low crack generation rate and less decrease in the capacitance can be obtained, when the thickness td of the dielectric layers is 0.4 μm or less, the width W0 is 0.59 mm or less, the gap Wgap is 0.010 to 0.025 mm, and the ratio (Wgap/W0) is 0.025 or more.

TABLE 3

| No. | L0 [mm] | W0 [mm] | Wgap [mm] | Wgap/W0 | Thickness of dielectric layers td [μm] | Thickness of internal electrode te [μm] | te/td | Crack generation rate [%] | Capacitance ratio |
|---|---|---|---|---|---|---|---|---|---|
| 4a | 1.02 | 0.59 | 0.025 | 0.042 | 0.4 | 0.38 | 0.95 | 0.5 | 0.94 |
| 4b | 1.02 | 0.59 | 0.025 | 0.042 | 0.4 | 0.42 | 1.05 | 0.8 | 1 |
| 4c | 1.02 | 0.59 | 0.025 | 0.042 | 0.4 | 0.5 | 1.25 | 5 | 1.03 |
| 15a | 0.620 | 0.350 | 0.025 | 0.071 | 0.4 | 0.38 | 0.95 | 0 | 0.91 |
| 15b | 0.620 | 0.350 | 0.025 | 0.071 | 0.4 | 0.42 | 1.05 | 0.5 | 0.94 |
| 15c | 0.620 | 0.350 | 0.025 | 0.071 | 0.4 | 0.5 | 1.25 | 10 | 0.96 |
| 17a | 0.620 | 0.350 | 0.015 | 0.043 | 0.4 | 0.38 | 0.95 | 0.1 | 1.08 |
| 17b | 0.620 | 0.350 | 0.015 | 0.043 | 0.4 | 0.42 | 1.05 | 0.3 | 1.1 |
| 17c | 0.620 | 0.350 | 0.015 | 0.043 | 0.4 | 0.5 | 1.25 | 22 | 1.16 |
| 23a | 0.380 | 0.185 | 0.015 | 0.081 | 0.4 | 0.38 | 0.95 | 0 | 0.95 |
| 23b | 0.380 | 0.185 | 0.015 | 0.081 | 0.4 | 0.42 | 1.05 | 0 | 1.04 |
| 23c | 0.380 | 0.185 | 0.015 | 0.081 | 0.4 | 0.5 | 1.25 | 11 | 1.14 |
| 24a | 0.380 | 0.185 | 0.010 | 0.054 | 0.4 | 0.38 | 0.95 | 0.4 | 0.98 |
| 24b | 0.380 | 0.185 | 0.010 | 0.054 | 0.4 | 0.42 | 1.05 | 0.7 | 1.01 |
| 24c | 0.380 | 0.185 | 0.010 | 0.054 | 0.4 | 0.5 | 1.25 | 17 | 1.04 |

Evaluation 2

From the results shown in Table 3, it was confirmed that the multilayer ceramic capacitor with low crack generation rate and less decrease in the capacitance can be obtained, when te/td is less than 1.25 and particularly preferably te/td is 0.95 to 1.05.

Example 4

As shown in Table 4, samples (sample numbers 16a and 16b) of the multilayer ceramic capacitors were manufactured similarly with sample 16 of Example 1, except the average grain size Dg of the dielectric grains in the exterior area 11 was varied relative to the average grain size Di of the dielectric grains in the capacitance region 14. The capacitance and the crack generation rate thereof were respectively measured similarly with sample 16 of Example 1. Results are shown in Table 4. In order to obtain the relation: Dg/Di is 1 or more, the average particle size of the dielectric particles in the raw material included in the dielectric paste forming the exterior area 11 was determined 60 nm.

Example 5

As shown in Table 5, samples (sample numbers 16c and 16d) of the multilayer ceramic capacitors were manufactured similarly with sample 16 of Example 1, except the average grain size Dh of the dielectric grains in the lead-out areas 15A and 15B was varied relative to the average grain size Di of the dielectric grains in the capacitance region 14. The capacitance and the crack generation rate thereof were respectively measured similarly with sample 16 of Example 1. Results are shown in Table 5. In order to obtain the relation: Dh/Di is 1 or more, the average particle size of the dielectric particles in the raw material included in the step absorbing dielectric paste forming the lead-out areas 12A and 12B and the side protection region 16 was determined 60 nm.

Note the average grain size of the dielectric grains after firing were confirmed by the following method.

(The Average Grain Size of the Dielectric)

The capacitor samples were made to stand vertically making the lamination direction upside, and periphery of the samples were embedded with a curable resin by using a Tefron (a registered trademark) made vessel of 25 mm size and 20 mm long. Then, samples were grinded to show the cross-section along the longitudinal direction using the sandpaper and a fine processing grinder; and milling using argon ion was carried out to remove the damage of the surface.

The dielectric grains in the capacitance region 14, the exterior area 11 and the lead-out areas 15A and 15B were observed by magnifying the processed samples twenty thousand times using an electron microscope. And using the image analysis system, an equivalent circle size was calculated from the cross-section areas of 500 grains.

| No. | L0 [mm] | W0 [mm] | Wgap [mm] | Wgap/ W0 | Thickness of dielectric layers td [μm] | Thickness of internal electrode te [μm] | Crack generation rate [%] | Capacitance ratio | Dg/ Di | Average grain size in capacitance region Di [μm] | Average grain size in exterior area Dg [μm] |
|---|---|---|---|---|---|---|---|---|---|---|---|
| 16 | 0.620 | 0.350 | 0.020 | 0.057 | 0.4 | 0.4 | 0 | 1 | 0.81 | 0.33 | 0.27 |
| 16a | 0.620 | 0.350 | 0.020 | 0.057 | 0.4 | 0.4 | 0 | 1.12 | 1 | 0.33 | 0.33 |
| 16b | 0.620 | 0.350 | 0.020 | 0.057 | 0.4 | 0.4 | 0 | 1.22 | 1.15 | 0.33 | 0.38 |

| No. | L0 [mm] | W0 [mm] | Wgap [mm] | Wgap/ W0 | Thickness of dielectric layers td [μm] | Thickness of internal electrode te [μm] | Crack generation rate [%] | Capacitance ratio | Dh/ Di | Average grain size in capacitance region Di [μm] | Average grain size in lead-out areas Dh [μm] |
|---|---|---|---|---|---|---|---|---|---|---|---|
| 16 | 0.620 | 0.350 | 0.020 | 0.057 | 0.4 | 0.4 | 0 | 1 | 0.88 | 0.33 | 0.29 |
| 16c | 0.620 | 0.350 | 0.020 | 0.057 | 0.4 | 0.4 | 0 | 1.11 | 1 | 0.33 | 0.33 |
| 16d | 0.620 | 0.350 | 0.020 | 0.057 | 0.4 | 0.4 | 0 | 1.23 | 1.23 | 0.33 | 0.41 |

Evaluation 3

From the results shown in Table 4, it was confirmed that the capacitance further improves and the crack generation rate is low, when the relation is preferably $Dg/Di \geq 1$, more preferably $Dg/Di \geq 1.05$, and the most preferably $Dg/Di \geq 1.15$.

From the results shown in Table 5, it was confirmed that the capacitance further improves and the crack generation rate is low, when the relation is preferably $Dh/Di \geq 1$, more preferably $Dh/Di \geq 1.1$, and the most preferably $Dh/Di \geq 1.2$.

Note in Example 5, the average particle size of the dielectric particles in raw materials included in the step absorbing dielectric paste was determined 60 nm; thus, it was confirmed that it is larger than the average grain size $Dh'$ of the dielectric grains after firing included in the side protection region 16 shown in FIG. 2 and the average grain size $Di$ of the dielectric grains after firing in the capacitance region 14. It is also confirmed that $Dh'/Di$ is almost the same with $Dh/Di$.

DESCRIPTION OF THE NUMERALS

2: Multilayer ceramic capacitor
4: Capacitor element body
6: The first terminal electrode
8: The second terminal electrode
10: Inside dielectric layers
    10a: Inside green sheet
11: Exterior area
    11a: Outside green sheet
12: Internal electrode layers
    12A, 12B: Lead-out part
    12a: Internal electrode pattern layer
13: Interior area
    13a: Internal laminated body
14: Capacitance region
15A, 15B: Lead-out areas
16: Side protection region
20: Step absorbing layers

What is claimed is:

1. A multilayer ceramic electronic device comprising:
    a ceramic element body, in which a plurality of dielectric layers and a plurality of internal electrode layers are alternately stacked, and
    at least a pair of external electrodes which are connected to the internal electrode layers on surfaces of the ceramic element body, wherein
    a thickness of the dielectric layers is 0.5 μm or less,
    a width (W0) of the ceramic element body along a width-direction is 0.59 mm or less,
    a gap (Wgap) between an outer face of the ceramic element body and an end of the internal electrode layers along width-direction of the ceramic element body is 0.010 to 0.025 mm, and
    a ratio (Wgap/W0) of the gap with respect to the width is 0.025 or more, and Dh/Di>1 is satisfied after firing, in the case that
        an average grain size of first dielectric grains constituting the dielectric layers placed between the internal electrode layers along a laminating direction is Di, and
        an average grain size of third dielectric grains constituting a lead-out area placed between a lead-out parts of the internal electrode layers connected to either one of the external electrodes is Dh.

2. The multilayer ceramic electronic device as set forth in claim 1,
    wherein a ratio (te/td) of a thickness (te) of the internal electrode layers with respect to a thickness (td) of the dielectric layers is 0.95 or more.

3. The multilayer ceramic electronic device as set forth in claim 2,
    wherein a ratio (te/td) of a thickness (te) of the internal electrode layers with respect to a thickness (td) of the dielectric layers is less than 1.25.

4. The multilayer ceramic electronic device as set forth in claim 1,
    wherein a ratio (te/td) of a thickness (te) of the internal electrode layers with respect to a thickness (td) of the dielectric layers is less than 1.25.

5. The multilayer ceramic electronic device as set forth in claim 1,
    wherein a ratio (te/td) of a thickness (te) of the internal electrode layers with respect to a thickness (td) of the dielectric layers is 0.95 to 1.05.

* * * * *